March 25, 1958  M. C. TOWNS, JR  2,827,762
CONSTANT SPEED REACTION MOTOR
Filed Feb. 15, 1952  3 Sheets-Sheet 2
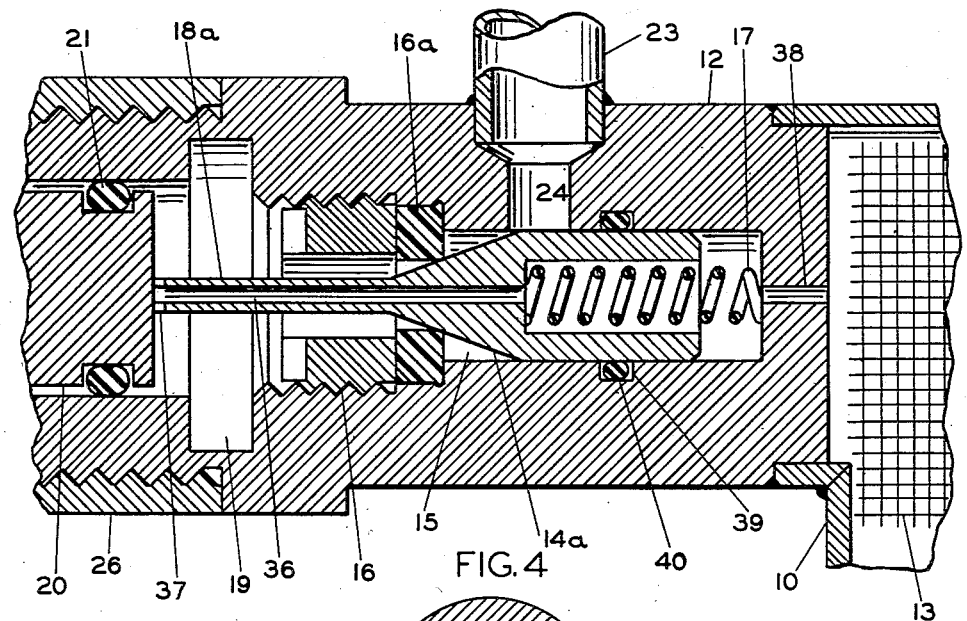
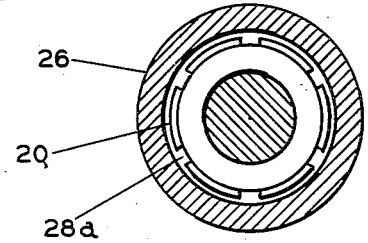
FIG.3
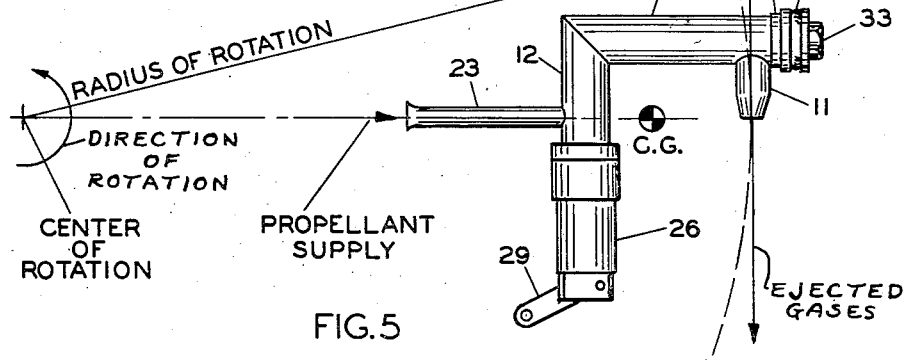
FIG.5
INVENTOR
M.C. TOWNS, JR.
BY
AGENT March 25, 1958     M. C. TOWNS, JR     2,827,762
CONSTANT SPEED REACTION MOTOR
Filed Feb. 15, 1952     3 Sheets-Sheet 3

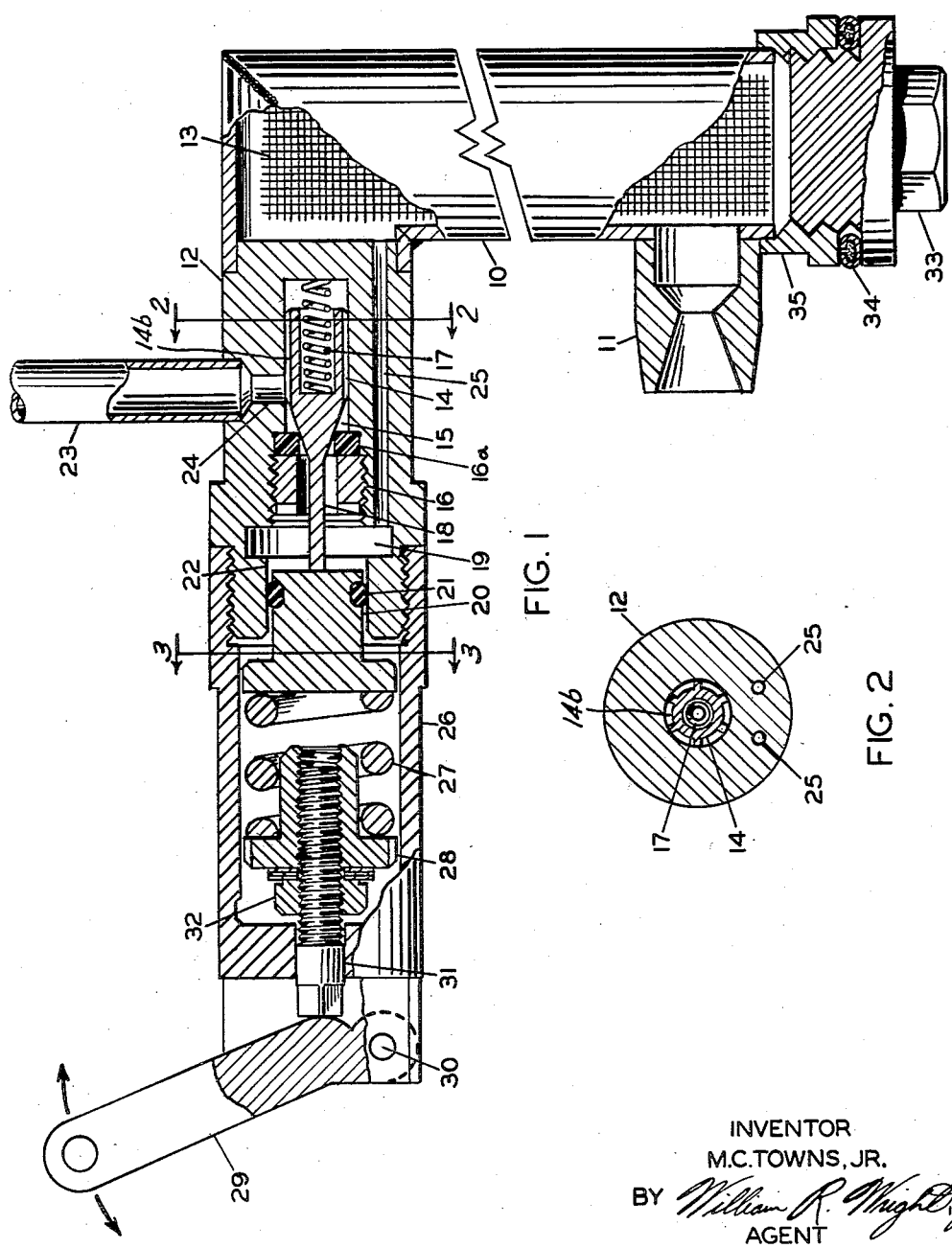

INVENTOR
M.C. TOWNS, JR.
BY *William R. Wright Jr.*
AGENT

United States Patent Office 2,827,762
Patented Mar. 25, 1958

2,827,762

CONSTANT SPEED REACTION MOTOR

Mirabeau C. Towns, Jr., Morristown, N. J., assignor to Reaction Motors, Inc., Rockaway, N. J., a corporation of New Jersey Application February 15, 1952, Serial No. 271,702

6 Claims. (Cl. 60—39.35)

The present invention relates to a motor of the reaction or jet propulsion type wherein a mass of high pressure gases or vapors is produced and expanded at high velocity through a suitable outlet to create a propulsive thrust by virtue of the reactive effect of the high velocity expulsion of the gaseous products. It relates more particularly to that class of reaction motors, generally known as rockets, which are not dependent upon the atmosphere as a source of oxygen or air to be used within the motor as part of the mass of gaseous products. In the present invention, the gases produced within the motor are derived solely from a single fluid fed into the motor without the use or necessity for atmospheric air or any other fluid to aid in this effect. A fluid used in this manner can be termed a single propellant, or monopropellant, since, as an end result and by means of the motor, it produces a thrust to propel the motor and a suitable vehicle.

The present invention is a reaction motor which is particularly well suited for the purpose of driving a rotary device by the application of its center line of thrust approximately tangentially to the circular path followed by a point on the radius of such a device in the general manner of the commonly known pinwheel firework. There are many devices to which the motor comprising the present invention can be applied, such as rotary-winged aircraft driven by reaction motors mounted on their rotor blades or a flywheel of an electrical power generating plant having such motors so mounted as to apply a rotative force to the wheel.

It is apparent in such applications that the more commonly known powder type rocket motor is very limited in its usefulness and controllability. Once ignited a powder rocket must continue to operate until its powder is exhausted without control of the extent of the thrust by the operator of the device. In the case of a rotary-winged aircraft, such lack of control of the amount of thrust at the will of the pilot would be fatal to proper flight of the aircraft where the aerodynamic loads are continually changing as the aircraft passes through moving air currents in level flight or where it is ascending, descending or hovering. It is evident, then, that it would be most advantageous to be able to automatically control the amount of thrust applied to the rotor blade for different aerodynamic loading conditions in order that the speed of rotation could be maintained at a nearly constant rate, the speed of rotation otherwise increasing with a decrease in aerodynamic load and vice versa. It will also be evident that it is desirable for the operator to be able to increase or decrease the thrust of the motor manually without loss of the automatic thrust adjustment feature. The foregoing advantages have been achieved in the present invention.

It has been found that a motor mounted upon the radius of a rotating device will have centrifugal loads acting upon it which become of great magnitude if the speed of rotation is high or the distance from the rotational axis to the motor is great. In a rotary-winged aircraft where the radius is considerable and the speed of rotation relatively high considering the nature of the device, the centrifugal loads become tremendous and are subject to great change for a slight change in the speed of rotation. The motor which comprises the present invention is so configured as to reduce the effects of this load and its fluctuation to where the effects on the physical working of the mechanical parts of the device are negligible and are even applied to advantage in a portion of the motor.

It is, therefore, an object of the present invention to provide a reaction motor wherein the thrust produced by the motor can be remotely controlled at the will of an operator.

It is also an object of the present invention to provide a fluid propellant reaction motor comprising a novel combination which responds to a change in the speed of rotation of the device to which it is attached by sensing the change in pressure of its own propellant as it enters the motor, and by automatically metering the correct amount of propellant to the motor to produce the thrust required to restore the original speed of rotation regardless of the extent of the load which first brought about the change in speed or rotation.

It is, therefore, a principal object of the present invention to provide a variable thrust reaction motor which will automatically vary its thrust output as needed to maintain a substantially constant speed of rotation of a rotary device on the radius of which the motor may be mounted as a driving means, regardless of variations in load on the rotary device.

It is also an object of the present invention to provide a fluid propellant reaction motor which is so configured as to function more effectively under conditions of centrifugal loading than would be the case if the motor were not so arranged.

It is also an object of the present invention to provide a simple and lightweight rocket motor of the foregoing type which requires a single fluid or monopropellant for its operation.

In the drawings:

Figure 1 is a longitudinal sectional view of the entire motor.

Figure 2 is a transverse cross sectional view of the motor taken through Figure 1 at section 2—2 looking away from the reaction chamber.

Figure 3 is a transverse cross sectional view of the motor taken through Figure 1 at section 3—3 looking in the direction of the reaction chamber.

Figure 4 is a longitudinal cross sectional view of a portion of the motor showing an alternate arrangement for admitting fuel to the reaction chamber.

Figure 5 is a diagrammatic view showing the motor mounted so as to cause rotation, and showing the motor's position with respect to the center of rotation.

Figure 6:
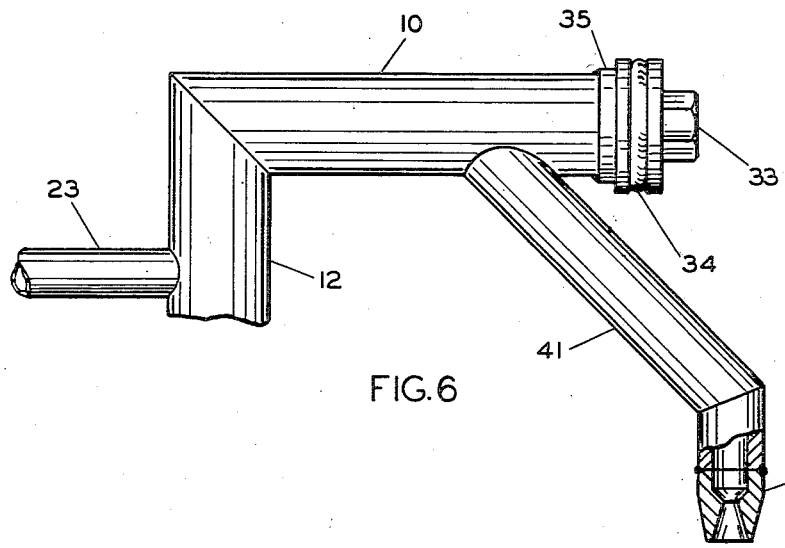
Figure 6 is an external view of the motor showing its nozzle mounted upon a conduit extending from the motor's reaction chamber.

As previously mentioned in this specification, a fluid, single propellant is utilized in the motor which comprises the present invention. Is has been found that concentrated hydrogen peroxide ($H_2O_2$) liquid is well suited to this purpose. It is not intended, however, that the present invention shall be limited to the use of hydrogen peroxide as the propellant. This liquid will decompose very rapidly and exothermically, particularly in the presence of a suitable catalyst, breaking down into water vapor and oxygen which become heated by the very considerable heat released by the decomposition process. In the present invention, the hydrogen peroxide liquid, is brought into contact with a catalyst contained within a reaction chamber and is thus decomposed. The gaseous products of this decomposition immediately become heated by the heat liberated by the process, and, since they are confined, a high pressure is developed in the reaction chamber. These high pressure gases are then allowed to expand through a constricted outlet, preferably a convergent-divergent nozzle, into the atmosphere to create a propulsive thrust by virtue of the reaction effect. The process is continuous until stopped by an operator or automatic means, and will create an amount of thrust dependent upon the rate of flow of propellant into the reaction chamber. Since the rate of flow into the reaction chamber is regulated by the fixed size and length of the entrance passages or conduits to the reaction chamber, it is evident that the pressure of the propellant before it enters these passages will determine the rate of flow and resultant thrust. Accordingly, in the present invention, this pressure is carefully sensed and regulated by the mechanism so that the thrust may in turn be automatically controlled.

In the embodiment of such a motor as the driving means for a rotary device such as, for example, the rotors of a rotary-winged aircraft, there are problems brought about by the fact that the motor is located on the radius of a rotating beam and is therefore subject to extreme pressure and load effects not usually present under static conditions or to such a great extent with a motor mounted in a more conventional vehicle such as a fixed wing aircraft. In a rotary device, the centrifugal force which acts upon a body located on a radius varies according to the following relationship:

$$\text{Centrifugal force} = \frac{mv^2}{r}$$

where $m$=mass of the whole body
$v$=linear velocity of the center of gravity of the body
$r$=distance from the axis of rotation to the center of gravity of the body.

From this, it will be seen that any small change in the linear velocity of the center of gravity of the body brought about by an increase in the speed of rotation, will result in an increase in the centrifugal force according to the square of the new linear velocity. Conversely, a decrease in the speed of rotation and thus in the linear velocity of the center of gravity of the body will result in a similar decrease in the centrifugal force. In a device like a rotary-winged aircraft therefore, the pressure of liquid propellant fed to the motor through the rotor blades rotating at a normal speed will be of the order of several thousand pounds, and a slight change in the speed of rotation can easily result in a pressure change of the order of hundreds of pounds. The present inventor has solved this problem by the inclusion in his motor of a propellant pressure regulating means which will automatically and accurately control the pressure of the propellant just prior to its entry into the reaction chamber regardless of the great extent of the pressure involved, but reflecting the pressure changes in proper automatic changes in the amount of thrust required for each condition, i. e., to keep the speed of rotation substantially constant despite changes in load.

The motor as exemplified in the present embodiment and shown in Figure 1, comprises a chamber or reaction chamber 10 having a convergent-divergent nozzle or constricted outlet 11 at one end, a regulator body or head 12 at the other and a catalyst material or catalyst 13 within the chamber. The term reaction chamber is intended, however, to include the entire enclosure where the decomposition takes place rather than only a portion of it. As previously mentioned, regulator body 12 is attached to the reaction chamber substantially at its head end and is formed principally into two chambers, namely inlet chamber 15 and propellant chamber 19. Inlet chamber 15 is cylindrical in form and contains tapered piston 14 and helical spring 17, piston 14 being slidable in the chamber and being acted upon by compression spring 17 to force it to the left in Figure 1.

A cross sectional view of piston 14 and body 12 is shown in Figure 2 where it will be seen that piston 14 has longitudinal grooves 14b in its surface to permit passage of propellant as described later in this specification. A pintle 18, which is actually an extension of piston 14, extends outward from the left end of piston 14 and passes through a communicating opening between inlet chamber 15 and propellant chamber 19, the opening being a hole through the center of seat 16a and locking insert 16. Insert 16 is threaded in place so as to retain seat 16a exactly in its place as shown in order that the conical face of piston 14 will be in contact with the inner periphery of seat 16a to form a fluid-tight seal at that point. Pintle 18 extends sufficiently far into propellant chamber 19 to touch piston 20. Piston 20 is slidable in cylindrical bore 22 and has an O ring type resilient seal 21 set in it as shown to prevent any passage of fluid past this point. A hollow cylindrical cap 26 is attached by screw threads to body 12, and piston 20 is adapted to slide within the hollow interior of cap 26. The portion of piston 20 which slides in cap 26 is ported in the manner shown in Figure 3 by ports 28a to allow free passage of air which would otherwise be trapped. Helical compression spring 27 is provided above piston 20, that is to the left of piston 20 in Figure 1, its left-hand end being restrained by collar 28, which is in turn threaded to screw pin 31 and is held in place by locknut 32. Screw pin 31 extends outward through a suitable opening in cap 26 and has its outer end in contact with throttle arm 29 in the manner shown in Figure 1. A square shank is provided on the outer end of screw pin 31 so that a wrench may be applied to it to rotate it for adjustment purposes.

In operation, a propellant supply line 23 carries propellant to port 24 through which it enters chamber 15. It will be seen that fluid cannot flow past piston 14 where it seats on insert 16a unless piston 14 is first mechanically lifted from its seat. If this is done, however, fluid can flow through the central hole in insert 16a and locking collar 16 and enter chamber 19. However, since the projected area at the seat end of piston 14 is less than that at its other end, the resultant pressure force exerted on piston 14 will be in the direction of the seat to hold the piston tightly against it. Spring 17 also aids this effect, spring 17 being a light compression spring as compared to spring 27.

Figure 8:
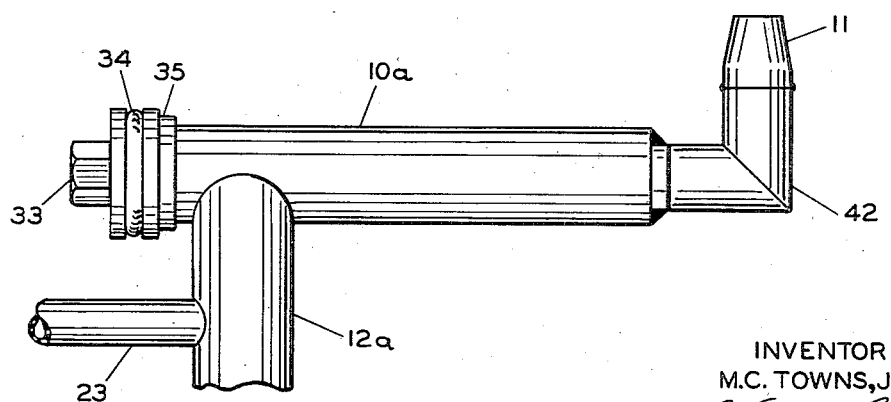
Figure 8 is an external view of the motor showing its nozzle mounted upon the end of the reaction chamber and headed in the opposite direction to that shown in Figure 1.

Upon movement of throttle arm 29 clockwise in Figure 1, it will rotate about hinge pin 30 and will depress screw pin 31 and its attached collar 28. This action exerts a force upon spring 27 which, because of its stiffness, causes piston 20 to move to the right in Figure 1 and strike against the end of pintle 18, thereby moving piston 14 away from its seat 16a. Hydrogen peroxide is thus allowed to flow through the central hole or opening in seat 16a and locking collar 16 to enter propellant chamber 19, from whence it flows through holes 25 into reaction chamber 10. Here it comes into contact with catalyst 13 which comprises a silver wire mesh preferably coated with samarium nitrate, and almost instantly is decomposed into water vapor and oxygen accompanied by the generation of a very considerable amount of heat. This heat of decomposition causes a high pressure to be created in reaction chamber 10 as the gaseous oxygen and water vapor become heated and these high pressure heated gases are then expanded through an outlet 11 into the atmosphere, outlet 11 preferably having a constricted or convergent-divergent throat in order that the gases passing through it may be given a high velocity with a resultant increase in thrust. While the nozzle is shown in but one position in Figure 1, i. e., aiming to what would normally be the rear of the engine, it may in some instances be desirable to locate the outlet in such a position that it is aimed forwardly as shown in Figure 8.

As piston 14 lifts from seat 16a, fluid flows past it into propellant chamber 19 where it exerts itself on the exposed face of piston 20 and upon the exposed conical end of piston 14 and pintle 18. As the pressure in chamber 19 increases, the force upon piston 20 at its pintle end also increases and forces it to the left in Figure 1 compressing spring 27. Meanwhile, pintle 18 and its attached piston 14 have also moved to the left. A condition of equilibruim is reached in accordance with the following mathematical relationship:

$$S_2 = A_1(P_1 - P_2) + A_2 P_2 + S_1$$

where $S_1$ = spring load of spring 17
$S_2$ = spring load of spring 27
$P_1$ = propellant inlet chamber pressure
$P_2$ = propellant chamber pressure
$A_1$ = cross sectional area of piston 14 at seat 16a
$A_2$ = area of piston 20 at pintle end From this relationship, it will be seen that the spring load of spring 27 determines the location of piston 14 in relation to seat 16a, and in effect establishes the value of the pressure of the propellant in propellant chamber 19. Any change in the load of spring 27 then will change the value of this pressure setting and will vary the thrust of the motor in accordance with this pressure change. Such a change in the load of spring 27 can be brought about in two ways as follows:

(1) Movement of collar 28 by means of a throttle lever to vary thrust at the will of an operator.

(2) Movement of piston 20 in bore 22.

The first of these actions can be brought about by movement of throttle lever 29 which rotates about its hinge pin 30 to depress or release screw pin 31 and move collar 28 as previously described in this specification. In the second instance, however, collar 28 remains stationary and piston 20 will be moved only by an increase or decrease in the value of the right hand side of the mathematical equation given above in this specification, i. e., the total force on piston 20 resisted by spring 27. It becomes evident from a consideration of this mathematical expression, keeping in mind that a particular steady $P_2$ in chamber 19 will have a corresponding $S_2$ setting of constant value, that the extent and direction of the motion of pistons 20 and 14 is determined not only by the difference in pressure between $P_1$ and $P_2$ but by the relative sizes of areas $A_1$ and $A_2$ and the spring loads $S_1$ and $S_2$. For a condition as exists in a rotary-winged aircraft where it is desirable to reduce $P_2$ as $P_1$ increases in order to create less thrust and thus decrease the speed of rotation of the blades, it is important that the values of $A_1$, $A_2$ and $S_1$ be such that as $P_1$ increases, the value of $S_2$ at its original steady setting value will be overcome and piston 20 will be moved to the left in Figure 1 because of this difference in load. As this occurs piston 20 moves to the left in Figure 1 and allows pintle 18 and its attached piston 14 to move its conical face closer to seat 16a allowing less propellant to flow into chamber 19, thus reducing the rate of propellant flow into the reaction chamber and reducing the thrust output of the motor. The speed of rotation will then decrease. If the speed of rotation should become less than the norm determined by the setting of the throttle, $P_1$ will decrease and the result will be movement of piston 20 and piston 14 in the opposite direction to provide for a greater rate of propellant flow and a consequent greater thrust.

If for any reason a particular application of the motor should make it desirable that the thrust should be increased with an increase in $P_1$, the ratio of area $A_1$ to $A_2$ and the spring loads $S_1$ and $S_2$ could be changed as a matter of physical design to make this possible. Also, by proper design proportioning of these parts, it is possible to keep the thrust output constant regardless of increases or decreases in $P_1$. Thus, it is not intended that the present invention be limited only to a means for decreasing thrust with an increase in inlet pressure $P_1$, but it is the intention to include these other arrangements which can be incorporated by simple changes in the physical design of the device, i. e., the ratio of areas $A_1$ and $A_2$ and the spring loads $S_1$ and $S_2$.

An alternate type of tapered piston 14a and pintle 18a is shown in Figure 4. In this modification of the present invention it will be seen that a longitudinal conduit or passage 36 has been provided through the center of pintle 18a and piston 14a to carry propellant from propellant chamber 19 into the space to the right of piston 14a in Figure 4 from whence it can pass into the reaction chamber through conduit or passage 37. A seal 40 of the O ring type is set in groove 39 in body 12 encircling piston 14a to prevent propellant from leaking along the outside of piston 14a. Also, a slot 37 is provided in the end of pintle 18a to easily admit propellant to passage 36 from chamber 19. With this arrangement, holes 25 are no longer necessary since propellant can flow from chamber 19 into the reaction chamber through passage 36 and conduit means 38 in the body and reaction chamber wall.

In general, the conical portions of pistons 14 and 14a are gradual in their taper, and consequently these pistons can move an appreciable distance while changing the opening between their conical faces and seat 16a only a small amount. This results in a smooth pressure regulation and a minimum of mechanical difficulties which would otherwise be present if the piston travels were necessarily made small to accommodate a sharply tapered piston. It is not intended, however, that the taper should be limited to that shown in the drawings.

Starting and stopping of the motor is very simple, for once the propellant has reached piston 14 through inlet 24, it is only necessary to advance the throttle to start the motor and to retard it completely to stop its operation. This action simply causes piston 14 to lift from seat 16a or to re-seat thereon to allow or shut off the flow of propellant.

As pointed out previously in this specification the motor which constitutes the present invention is particularly useful in an application where it is subjected to large fluctations in pressure such as would be brought about by changes in centrifugal force if the motor were attached to a beam having one end pivoted, the motor in effect being located on the radius of a circular path and having its propulsive jet directed tangentially thereto. Accordingly, the motor has been so shaped as to take advantage of this centrifugal force to improve the operation of the motor under such conditions. It is not intended that the motor should be limited to this particular configuration for all instances of installation but only those where a centrifugal force is applied to the motor. The motor is shaped roughly in the form of an L, or a T, having the leg which houses the regulating means substantially perpendicular to the line of action of the centrifugal force acting upon the motor, and the other or reaction chamber leg substantially in alignment with the line of action of the centrifugal force and extending radially outward from the other leg. The line of action of the centrifugal force and the motor's arrangement in relation thereto is shown in Figure 5. The nozzle or outlet for the reaction chamber is headed in a direction substantially normal to the line of action of the centrifugal force. By means of this configuration, the centrifugal force is utilized to force propellant rapidly through the catalyst, thus very effectively aiding in the rapidity of decomposition of the monopropellant with a resulting increase in efficiency. By having the leg which houses the regulating means substantially normal to the line of action of the centrifugal force, this force will have very little effect upon the movable parts contained therein since they are arranged to slide longitudinally along the leg, and a transverse force will have no tendency to cause them to move to disturb the pressure setting of the regulator.

This relationship of the principal components of the motor has been found to be very important to the proper and efficient operation of the motor under conditions of high centrifugal loads.

In Figure 5, the motor which comprises the present invention is shown in mounted position on a rotary device with its center of gravity, designated as "C. G." on the drawing, on a radius. This figure is representative of a typical mounting on a rotary device such as a rotary-winged aircraft, flywheel, or the like where the motor applies a tangential force to the circular path which it follows. It will be seen from the figure that the motor is so mounted that the longitudinal axis of the reaction chamber is substantially parallel to the radius of rotation, the regulator body 12 is substantially perpendicular thereto, and the center line of thrust of the nozzle 11 is also substantially perpendicular to the radius of rotation, the motor's thrust thus being applied tangentially to the circular path followed by the motor's outlet.

As previously pointed out in this specification, a very large centrifugal force will be present on the motor and on its propellant as the motor travels about its circular path. The present invention utilizes this effect to aid its operation. The disclosed configuration of the present invention substantially in the form of a right angle will aid the flow of monopropellant through the catalyst and, at the same time, aid operation of the regulating means since its parts move crosswise to these changes in force and are thus not moved from their settings.

Figure 7:
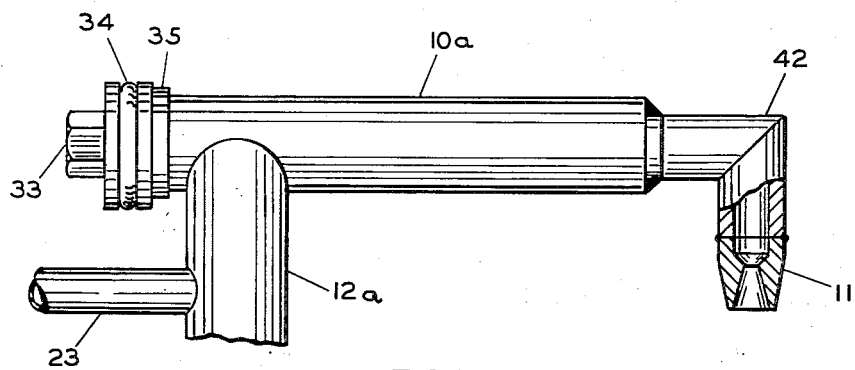
Figure 7 is an external view of the motor showing its nozzle mounted upon the end of the reaction chamber and headed in the same direction as that shown in Figure 1.

Modifications in location and arrangement of constricted outlet or nozzle 11 are shown in each of Figures 6, 7 and 8. Figure 6 shows nozzle 11 attached to conduit or pipe 41 which extends from and communicates with reaction chamber 10 and is attached to and communicates with nozzle 11 at its other end. Conduit or pipe 41 can be of considerable length if desirable for locating the nozzle at a point remote from the motor.

In Figures 7 and 8 are shown modifications which have nozzle 11 mounted at the end of the reaction chamber headed in opposite directions. Connecting elbow 42 is also shown in Figure 8 headed in a direction opposite to that shown in Figure 7. Having the nozzle at the end of the chamber is advantageous in some installations, particularly in an aircraft where the outer end of the motor must be faired or streamlined to reduce air drag. The nozzles are headed in opposite directions to indicate that the motor can be used to create thrust in either direction for propulsion or braking, and to allow the motor to be installed, for example, in a position having the regulator body extending in the opposite direction to that shown in Figure 5 as might be expedient under certain conditions of installation.

A cleanout or catalyst removal plug 33 is shown in Figures 1, 5, 6, 7 and 8. This is threaded into a collar 35 on the end of chamber 10 and is provided with a gasket 34 to prevent leakage of the decomposition gases. Plug 33 is located at the end of reaction chamber 10 in Figures 1, 5 and 6 but is shown at the opposite end in Figures 7 and 8 in order that the nozzle may be located as shown in those figures. The reaction chambers and regulator bodies have been modified slightly to accommodate plug 33 and are designated in Figures 7 and 8 as numbers 10a and 12a.

While there have been shown and described and pointed out the fundamental novel features of this invention as applied to a single modification, it will be understood that various omissions and substitutions and changes in the form and details of the device illustrated and in its operation may be made by those skilled in the art without departing from the spirit of the invention. It is the intention therefor to be limited only as indicated by the scope of the following claims.

What is claimed is:

1. A power plant for driving a rotary device comprising a reaction motor fixed to the device at a distance from its center of rotation; said motor having a reaction chamber, a restricted outlet, and means, including parts movable along the longitudinal axis of the means, for admitting a propellant to said chamber in regulated amounts to automatically maintain a given speed of said motor; said axis being arranged normal to the radius of rotation of the motor about the center of rotation whereby the movement of said parts to regulate said amounts is unaffected by centrifugal forces; said means and said parts comprising a body having a fuel inlet chamber and a propellant chamber with a communicating opening therebetween, conduit means between the propellant chamber and the reaction chamber, a tapered, spring-loaded piston valve slidable within said inlet chamber in sealing relationship to said body and extending into said opening, and means responsive only to propellant pressure changes in said propellant chamber for moving said piston valve relative to said opening to vary the amounts of propellant passing through said opening.

2. A device as recited in claim 1 wherein said responsive means comprises a spring-loaded piston exposed to propellant pressure within the propellant chamber and in opposition to and in contact with said tapered piston valve.

3. A device as recited in claim 2 wherein an operator controlled throttle arm is operatively connected with said body to vary the spring load on said piston to vary said set given speed.

4. A power plant for driving a rotary device comprising a reaction motor fixed to the device at a distance from its center of rotation; said motor having a reaction chamber, a restricted outlet, and means, including parts movable along the longitudinal axis of the means, for admitting a propellant to said chamber in regulated amounts to automatically maintain a given speed of said motor; said axis being arranged normal to the radius of rotation of the motor about the center of rotation whereby the movement of said parts to regulate said amounts is unaffected by centrifugal forces; said means and parts comprising a body having a fuel inlet chamber and a propellant chamber with a communicating opening therebetween, a tapered, spring-loaded piston valve slidable within said inlet chamber in sealing relationship to said body and extending into said opening, a longitudinal passage through said piston valve connecting said propellant chamber with said reaction chamber, and means responsive only to propellant pressure changes in said propellant chamber for moving said piston valve relative to said opening to vary the amount of propellant passing through said opening.

5. A device as recited in claim 4, wherein said responsive means comprises a spring-loaded piston exposed to propellant pressure within the propellant chamber and in opposition to and in contact with said tapered piston valve.

6. A device as recited in claim 5 wherein an operator controlled throttle arm is operatively connected with said body to vary the spring load on said piston to vary said set given speed.

References Cited in the file of this patent

UNITED STATES PATENTS

| | | |
|---|---|---|
| 1,871,117 | Day | Aug. 9, 1932 |
| 1,940,934 | Bennett et al. | Dec. 26, 1933 |
| 2,301,031 | Ferguson | Nov. 3, 1942 |
| 2,398,201 | Young et al. | Apr. 9, 1946 |
| 2,433,932 | Stosick | Jan. 6, 1948 |
| 2,514,749 | | |
| 2,548,268 | | |
| 2,590,853 | | |
| 2,601,607 | | |
| 2,605,609 | | |
| 2,648,190 | | |
| 2,716,459 | | |
| | Dobbins | July 11, 1950 |
| | Metsger | Apr. 10, 1951 |
| | Fulton | Apr. 1, 1952 |
| | Halford et al. | June 24, 1952 |
| | Bush | Aug. 5, 1952 |
| | Maisner | Aug. 11, 1953 |
| | Toney et al. | Aug. 30, 1955 |

FOREIGN PATENTS

| 227,151 | Great Britain | Jan. 12, 1925 |